United States Patent
Usami

(10) Patent No.: US 8,659,406 B2
(45) Date of Patent: Feb. 25, 2014

(54) VEHICLE IMAGING SYSTEM AND VEHICLE CONTROL APPARATUS

(75) Inventor: Masayuki Usami, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 990 days.

(21) Appl. No.: 12/127,354

(22) Filed: May 27, 2008

(65) Prior Publication Data

US 2008/0297374 A1    Dec. 4, 2008

(30) Foreign Application Priority Data

May 30, 2007    (JP) ................................ 2007-144088

(51) Int. Cl.
    *B60Q 1/00*    (2006.01)
(52) U.S. Cl.
    USPC .................................... 340/435; 340/425.5
(58) Field of Classification Search
    USPC .................. 340/425.5, 435, 436, 438, 439
    See application file for complete search history.

(56) References Cited

U.S. PATENT DOCUMENTS

| | | | | |
|---|---|---|---|---|
| 6,150,930 | A * | 11/2000 | Cooper ........................ | 340/435 |
| 6,759,949 | B2 * | 7/2004 | Miyahara ..................... | 340/435 |
| 7,092,007 | B2 * | 8/2006 | Eguchi et al. ................ | 348/148 |
| 7,304,568 | B2 * | 12/2007 | Ohkawara et al. ........... | 340/438 |
| 7,359,782 | B2 * | 4/2008 | Breed .......................... | 701/45 |
| 7,526,103 | B2 * | 4/2009 | Schofield et al. ............ | 382/104 |
| 7,791,458 | B2 * | 9/2010 | Shimaoka et al. ........... | 340/435 |
| 2004/0240221 | A1 * | 12/2004 | Choi ............................. | 362/510 |
| 2005/0035926 | A1 * | 2/2005 | Takenaga et al. ............ | 345/8 |
| 2005/0099129 | A1 * | 5/2005 | Ishigami et al. ............. | 313/637 |
| 2005/0248953 | A1 * | 11/2005 | Irmscher et al. ............. | 362/459 |

FOREIGN PATENT DOCUMENTS

| | | |
|---|---|---|
| DE | 102 54 023 A1 | 6/2004 |
| DE | 103 15 741 A1 | 11/2004 |
| DE | 103 35 189 A1 | 3/2005 |
| DE | 10 2004 001 556 A1 | 8/2005 |
| DE | 10 2004 028 616 A1 | 2/2006 |
| JP | 8-248133 | 9/1996 |
| JP | 2000-147124 | 5/2000 |
| JP | 3119031 | 10/2000 |
| JP | 2000-318513 | 11/2000 |

(Continued)

OTHER PUBLICATIONS

Volker Graefe, et al., "Echtzeit-Bildverarbeitung Für Ein Fahrer-Unterstützungssystem Zum Einsatz Auf Autobahnen", it+ti—Informationstechnik Und Technische Informatik 36 (1994) 1, Issue 1/94, Special Issue Robotik, R. Oldenbourg Verlag, pp. 16-24.

*Primary Examiner* — James Yang
(74) *Attorney, Agent, or Firm* — Oblon, Spivak, McClelland, Maier & Neustadt, L.L.P.

(57) ABSTRACT

A vehicle imaging system includes an imaging device that images at least a part of an area around a vehicle; and a visible light attenuation device that attenuates part of visible light that enters the imaging device. The imaging device includes an imaging element that converts both of the infrared light and an infrared ray to electric signals. The imaging device outputs both of image data produced based on the electric signal to which the visible light, which has entered the imaging device without passing through the visible light attenuation device, has been converted, and image data produced based on the electric signal to which the infrared ray, which has passed through the visible light attenuation device, has been converted.

8 Claims, 7 Drawing Sheets

(56) References Cited

FOREIGN PATENT DOCUMENTS

| JP | 2004-31020 | 1/2004 |
| JP | 2004-104646 | 4/2004 |
| JP | 2005-14845 | 1/2005 |
| JP | 2005-29066 | 2/2005 |
| JP | 2005-47390 | 2/2005 |
| JP | 2005-85621 | 3/2005 |
| JP | 2005-112052 | 4/2005 |
| JP | 2005-123798 | 5/2005 |

* cited by examiner

F I G . 3
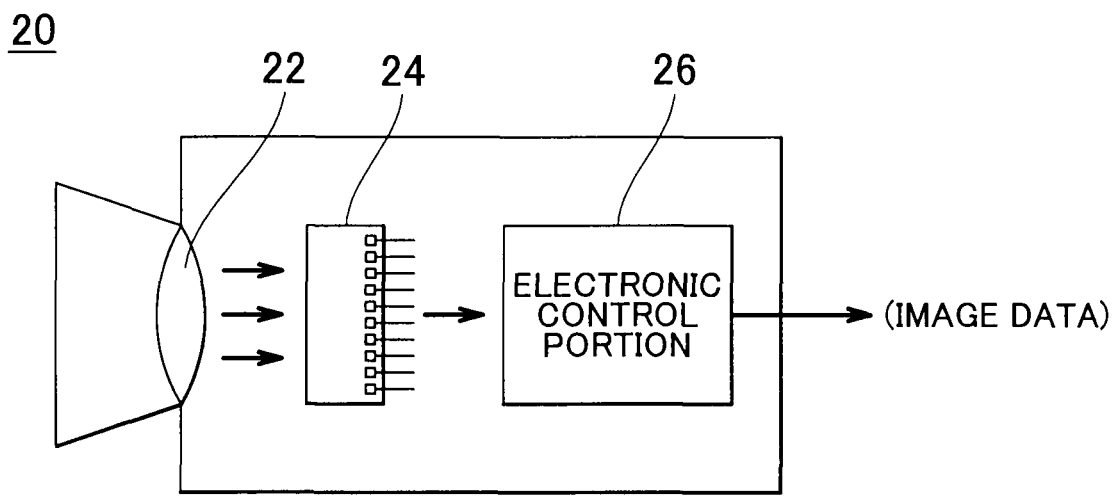

F I G . 5

| TIME ZONE | NIGHT | | DAYTIME |
|---|---|---|---|
| DRIVER'S OPERATION | LOW BEAM | HIGH BEAM | INFRARED RAY PROJECTION MODE |
| LOW BEAM HEAD LAMP | ON | OFF (OR ON) | OFF |
| HIGH BEAM HEAD LAMP | ON (FILTER COVERS HIGH BEAM HEAD LAMP) | ON (FILTER DOES NOT COVER HIGH BEAM HEAD LAMP) | ON (FILTER COVERS HIGH BEAM HEAD LAMP) |

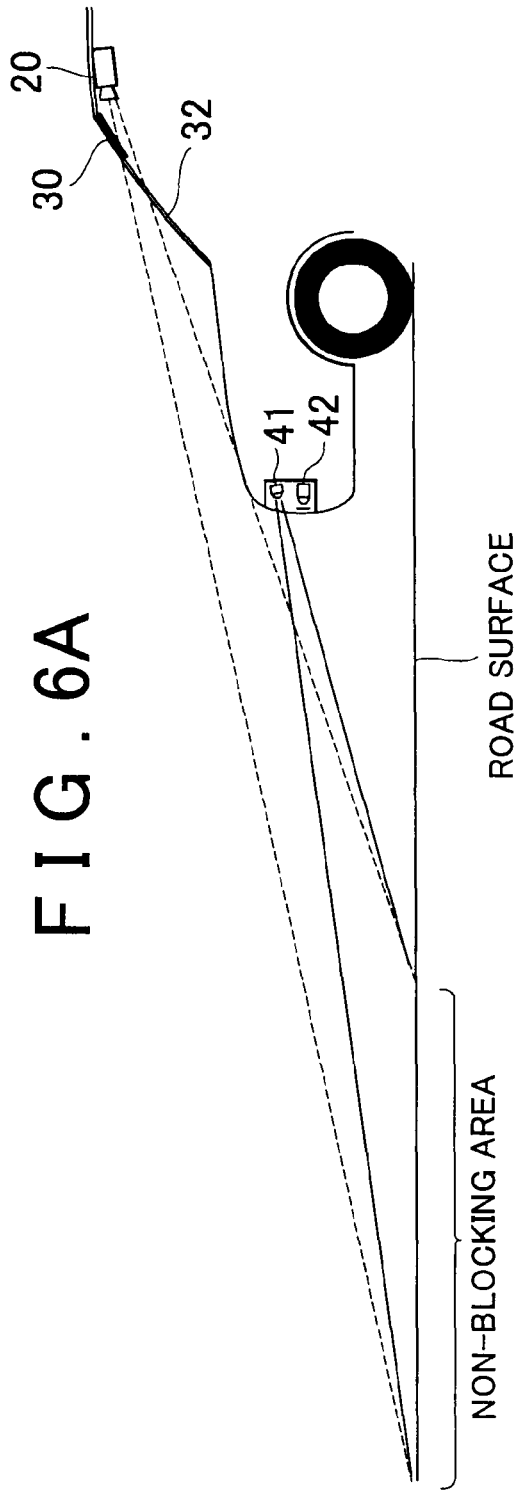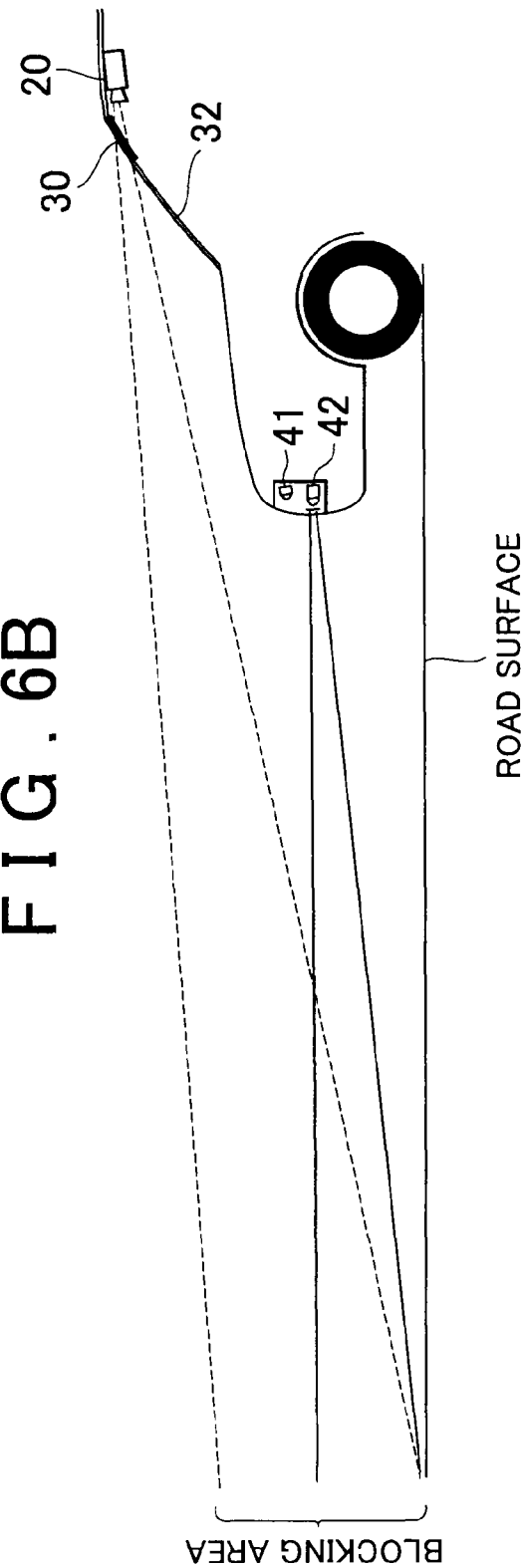

# VEHICLE IMAGING SYSTEM AND VEHICLE CONTROL APPARATUS

INCORPORATION BY REFERENCE

The disclosure of Japanese Patent Application No. 2007-144088 filed on May 30, 2007 including the specification, drawings and abstract is incorporate herein by reference in its entirety.

BACKGROUND OF THE INVENTION

1. Field of the Invention

The invention relates to a vehicle imaging system that images at least a part of an area around a vehicle, and outputs image data, and a vehicle control apparatus using the vehicle imaging system.

2. Description of the Related Art

Recently, a control system called, for example, LKA (Lane Keeping Assist), has been available. The control system detects the position of a road compartment line drawn or laid on a road, recognizes the positional relation between a host vehicle and a driving lane, and executes a control so that steering torque is automatically output to make the host vehicle travel without deviating from the driving lane (hereinafter, the control will be referred to as "lane keeping control").

Also, a control system called, for example, a pre-crash safety system, is available, and the control system is being studied. The control system detects an object ahead of a vehicle, determines a possibility of a collision between the host vehicle and the object, and executes various controls (hereinafter, the controls will be referred to as "collision prediction control").

Also, for example, Japanese Patent Application Publication No. 2005-47390 (JP-A-2005-47390) describes the invention relating to a vehicle lighting system that emits light with a predetermined visible wavelength to an object imaged by infrared imaging means, and includes a filter that prevents the light with the predetermined wavelength from entering the eyes of a driver.

Also, for example, Japanese Patent No. 3119031 describes the invention relating to an imaging apparatus that includes a camera provided in an instrument panel, which images a head of a driver using an infrared ray; a visible light cut filter provided ahead of a front surface of the camera; and an infrared ray cut filter provided in an upper portion of a front windshield. In this apparatus, the infrared ray cut filter blocks the infrared ray entering a cabin from outside, thereby maintaining the intensity of the infrared ray that hits the head of the driver at a constant level.

In the above-described control systems, essential elements are means for recognizing a road compartment line, and means for detecting an object ahead of a vehicle. At present, as the means for recognizing a road compartment line, a CCD camera or a CMOS camera is used. As the means for detecting an object ahead of the vehicle, a millimeter wave radar is used. However, when both of the camera and the radar device are provided, size and cost of the entire apparatus is increased. Also, the radar device cannot clearly recognize an object with a low permittivity (i.e., an object that does not sufficiently reflect the radar wave). Therefore, although it is relatively easy for the radar device to recognize a vehicle, a guard rail, or the like, it is difficult for the radar device to recognize a pedestrian or the like.

In this regard, it is conceivable to project the infrared ray to a pedestrian or the like, and produce an image using the reflected infrared ray, or to produce an image using the infrared ray emitted from a pedestrian or the like due to the body temperature of the pedestrian or the like. If one camera is used to recognize a road compartment line and to produce an image using the infrared ray, the size and the cost of the entire apparatus is not increased.

However, the apparatus described in the above Japanese Patent Application publication No. 2005-47390 and the apparatus described in the above Japanese Patent No. 3119031 are provided for completely different purposes. Therefore, each of these apparatus cannot be used as the camera device for the lane keeping control and the collision prediction control.

SUMMARY OF THE INVENTION

The invention provides a vehicle imaging system that outputs image data produced by performing both of visible light imaging and infrared ray imaging, with a simple configuration. The invention also provides a vehicle control apparatus using the vehicle imaging system.

A first aspect of the invention relates to a vehicle imaging system that includes imaging means for imaging at least a part of an area around a vehicle; and visible light attenuation means for attenuating part of visible light that enters the imaging means. The imaging means includes an imaging element that converts both of the visible light and an infrared ray to electric signals. The imaging means outputs both of image data produced based on the electric signal to which the visible light, which has entered the imaging means without passing through the visible light attenuation means, has been converted, and image data produced based on the electric signal to which the infrared ray, which has passed through the visible light attenuation means, has been converted.

According to the first aspect of the invention, it is possible to output the image data produced by performing both of the visible light imaging and the infrared ray imaging, without providing a plurality of imaging means, that is, with a simple configuration.

The visible light attenuation means may be disposed on a front windshield. The imaging means may image an area ahead of the vehicle through the front windshield. In this case, the vehicle imaging system may include infrared ray projection means for projecting the infrared ray to a region ahead of the vehicle. The visible light attenuation means may be disposed to attenuate the visible light that enters the imaging means from the region to which the infrared ray is projected by the infrared ray projection means. Further, in this case, the region to which the infrared ray is projected by the infrared ray projection means may be farther from the vehicle than a region to which the visible light is emitted by a low beam head lamp.

The visible light attenuation means may be disposed between the imaging element and an imaging lens that are provided in the imaging means.

A second aspect of the invention relates to a vehicle control apparatus that includes the vehicle imaging system according to the first aspect of the invention; collision prediction control means for executing a collision prediction control based on the image data that is produced based on the electric signal to which the infrared ray has been converted, and that is output from the imaging means of the vehicle imaging system; and lane keeping control means for executing a lane keeping control based on the image data produced based on the electric signal to which the visible light has been converted.

According to the invention, it is possible to provide the vehicle imaging system that outputs the image data produced by performing both of the visible light imaging and the infrared ray imaging, with the simple configuration, and to provide the vehicle control apparatus using the vehicle imaging system.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 3 is a diagram showing an example of a hardware configuration of the camera;

FIG. 5 is a diagram showing an example of an on/off control for each head lamp and an example of an operation control for a movable filter;

FIGS. 6A and 6B show a manner in which the position, the size, and the range of the visible light cut filter is adjusted so that a region to which the visible light is projected by a low beam head lamp is included in a non-blocking area, and a region to which the visible light and an infrared ray are projected by a high beam head lamp is included in a blocking area;

DETAILED DESCRIPTION OF EMBODIMENTS

Hereinafter, an embodiment of the invention will be described with reference to the accompanying drawings.

Hereinafter, a vehicle imaging system 10 according to an embodiment of the invention, and a vehicle control apparatus 1 using the vehicle imaging system 10 will be described.

Figure 1:
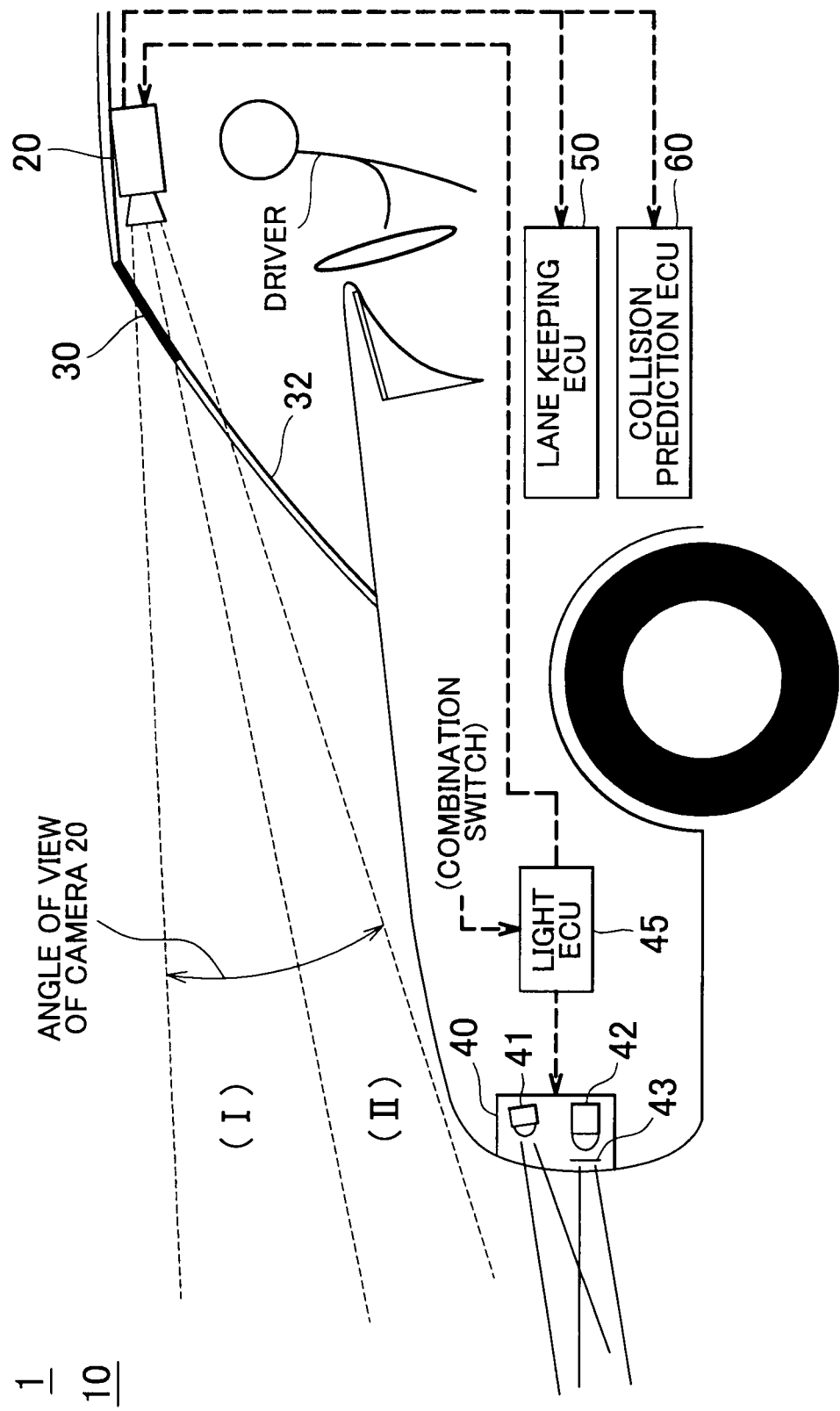
FIG. 1 is a diagram showing an example of an entire configuration of a vehicle control apparatus.

FIG. 1 is a diagram showing an example of an entire configuration of the vehicle control apparatus 1. The vehicle control apparatus 1 mainly includes the vehicle imaging system 10, a lane keeping ECU (Electronic Control Unit) 50, and a collision prediction ECU 60. In FIG. 1, the dashed line arrows indicate the flow of main information transmitted via wired or wireless communication.

The vehicle imaging system 10 includes a camera 20, a visible light cut filter 30, a head lamp assembly 40, and a light ECU 45.

Figure 2:
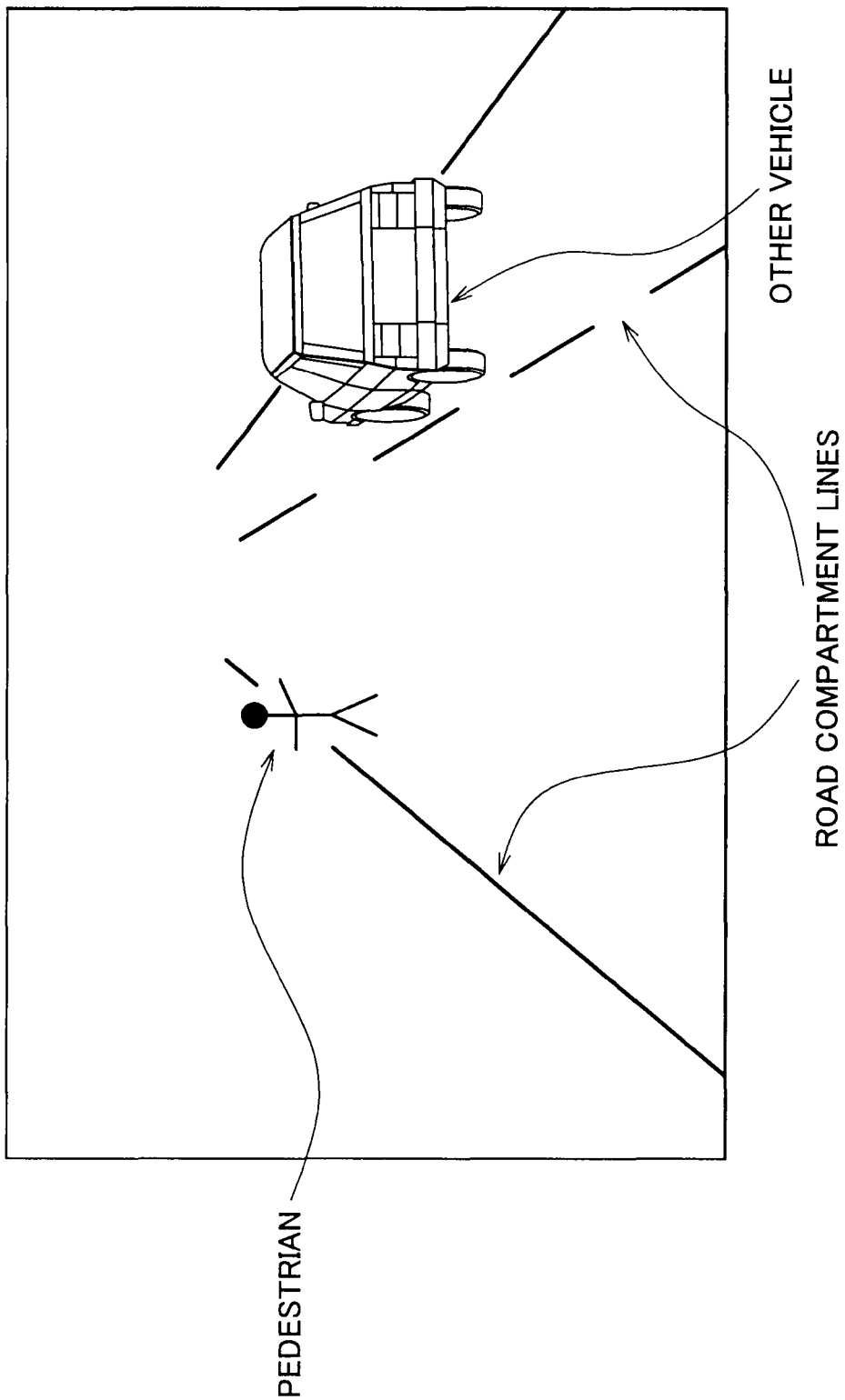
FIG. 2 is a diagram showing an example of a scene ahead of a vehicle, which is imaged by a camera.

For example, in the camera 20, a solid-state imaging device, such as a CCD (Charge Coupled Device), or a CMOS (Complementary Metal Oxide Semiconductor), is used. For example, the camera 20 is disposed near a ceiling portion in a vehicle cabin, and has a light axis that obliquely extends downward toward a position ahead of a vehicle. The angle of view of the camera 20 is adjusted to image an area extending from a road surface ahead of the vehicle to the substantially same height as that of the camera 20. FIG. 2 is a diagram showing an example of a scene ahead of the vehicle, which is imaged by the camera 20. As shown in FIG. 2, for example, the camera 20 can image road compartment lines drawn or laid on a road ahead of the vehicle, and another vehicle and a pedestrian ahead of the vehicle.

FIG. 3 is a diagram showing an example of a hardware configuration of the camera 20. For example, the camera 20 includes an imaging lens 22 that makes it possible to image the above-described area, an image sensor 24, and an electronic control portion 26. Hereinafter, the camera 20 will be described on the assumption that the camera 20 is a CCD camera.

For example, the image sensor 24 is an interline image sensor. The image sensor 24 includes photo diodes, CCDs corresponding to the photo diodes, and a transfer gate. The photo diodes are light-receiving devices that perform photoelectric conversion. The photo diodes are arranged in a two-dimensional plane, and the CCDs are arranged in a two-dimensional plane. The transfer gate, which functions as an analog switch, is provided between the photo diodes and the CCDs. A micro lens is attached to a front portion of each photo diode (i.e., the portion of each photo diode, which is close to the imaging lens 22), to collect rays of light. This structure is schematically shown as an example, to simply describe the function of the image sensor 24. Thus, any modification may be made to the design to improve the functionality of the image sensor 24. Also, the image sensor 24 need not necessarily be the interline image sensor. A full-frame transfer image sensor or a frame transfer image sensor, in which the CCD itself functions as the light-receiving device, may be used.

The image sensor 24 senses a near-infrared ray, in addition to visible light in an ordinary visible light range. Therefore, the camera can image an object that emits the near-infrared ray (an object that generates heat).

In the electronic control portion 26, for example, a microcomputer, an electronic circuit, and the like, are used. The electronic control portion 26 adjusts a shutter speed of the camera 20 and a cycle in which the camera 20 takes an image (for example, approximately several tens of times per one second), by controlling opening/closing timings of the transfer gate of the image sensor 24. Then, for example, the electronic control portion 26 amplifies data output from the output circuit of the image sensor 24 using a predetermined gain, and then, outputs the data to outside as image data.

The visible light cut filter 30 blocks or attenuates the visible light, and allows the near-infrared ray to pass through the visible light cut filter 30. The visible light cut filter 30 is attached to, inserted into, or integrally formed with a front windshield 32 to block or attenuate the visible light from an upper portion of the above-described area imaged by the camera 20. As shown from the positional relation in FIG. 1, the visible light cut filter 30 hardly obstructs the field of front vision of a driver.

Figure 4:
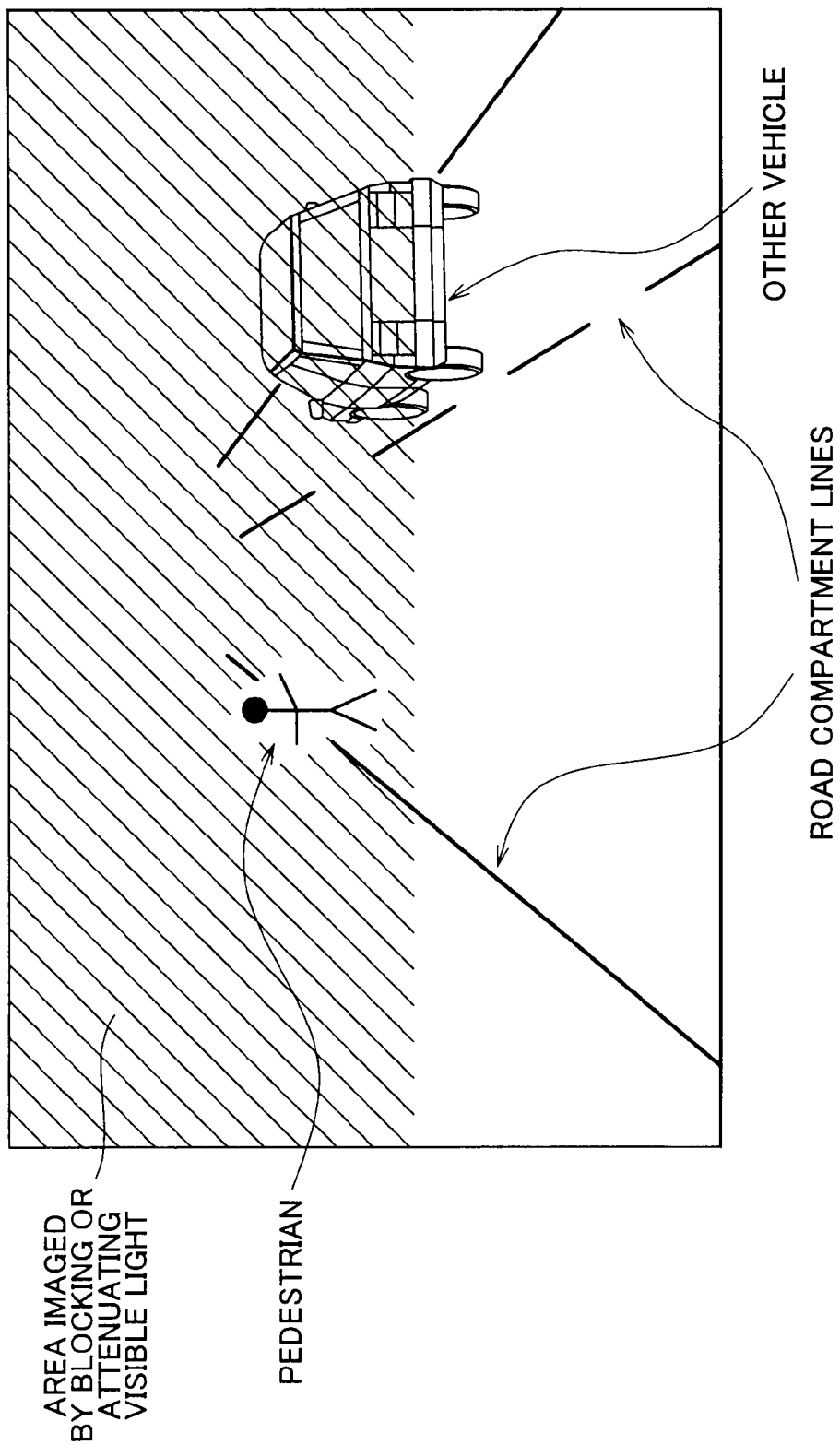
FIG. 4 is a diagram showing a manner in which part of visible light from the scene ahead of the vehicle shown in FIG. 2 is blocked or attenuated.

FIG. 4 is a diagram showing a manner in which the visible light cut filter 30 blocks or attenuates part of the visible light from the scene ahead of the vehicle shown in FIG. 2. As shown in FIG. 4, the visible light cut filter 30 does not block or attenuate the visible light from an area extending to a position several tens of meters away from a front end portion of the vehicle (hereinafter, the area will be referred to as "non-blocking area". The visible light from the non-blocking area enters the camera 20 via a portion (II) in FIG. 1). Thus, the camera 20 can image a road compartment line. The visible light cut filter 30 blocks or attenuates the visible light from an area farther from the front end portion of the vehicle than the non-blocking area (hereinafter, the farther area will be referred to as "blocking area". The visible light from the blocking area enters the camera 20 via a portion (I) in FIG. 1). Thus, the camera 20 can image only an object (for example, a pedestrian) that reflects the near-infrared ray, in the blocking area.

The head lamp assembly 40 includes a low beam head lamp 41, a high beam head lamp 42, and a movable filter 43. For example, the low beam head lamp 41 is an LED (Light Emitting Diode) lamp using a white light-emitting diode. For example, the high beam head lamp 42 is a halogen lamp that emits a relatively large amount of infrared rays. The movable filter 43 blocks or attenuates the visible light. The movable filter 43 is operated by an actuator (not shown). The position of the movable filter 43 is changed between a position at which the movable filter 43 covers a front surface of the high beam head lamp 42, and a position at which the movable filter 43 is removed from the front surface of the high beam head lamp 42.

The head lamp system according to the embodiment is configured so that an infrared ray projection mode is selectable by an operation performed by a user, when the head lamps do not emit the visible light, for example, during the daytime. In the infrared ray projection mode, the head lamp system emits an infrared ray forward to actively monitor a pedestrian or the like ahead of the vehicle, in cooperation with the camera 20. For example, the user may operate a GUI (Graphical User Interface) switch or other mechanical switches provided on a touch panel, when the user selects the infrared ray projection mode.

The light ECU 45 executes an on/off control for each head lamp, and an operation control for the movable filter 43. In a case (1) where the driver performs an operation to provide an instruction for low-beam light, the light ECU 45 turns on both of the low beam head lamp 41 and the high beam head lamp 42, and operates the actuator so that the movable filter 43 covers the front surface of the high beam head lamp 42. In a case (2) where the driver performs an operation to provide an instruction for high-beam light, the light ECU 45 turns on only the high beam head lamp 42, and operates the actuator so that the movable filter 43 is removed from the front surface of the high beam head lamp 42. In a case (3) where the driver selects the infrared ray projection mode during the daytime, the light ECU 45 turns on only the high beam head lamp 42, and operates the actuator so that the movable filter 43 covers the front surface of the high beam head lamp 42 (for the above-described controls executed by the light ECU 45, refer to FIG. 5). The driver operates, for example, a combination switch on the side of a steering wheel, or the GUI (Graphical User Interface) switch on the touch panel. In the case (2), the low beam head lamp 41 may be turned on. The light ECU 45 outputs a signal indicating the state of each head lamp (especially, the on/off state of the high beam head lamp 42), to the electronic control portion 26 when needed (i.e., at regular intervals, or each time the state of each head lamp is changed).

The position, the size, and the range of the visible light cut filter 30 may be adjusted so that a region to which the visible light is projected by the low beam head lamp 41 is included in the non-blocking area, and a region to which the visible light and the infrared ray are projected by the high beam head lamp 42 is included in the blocking area (refer to FIG. 6). In this case, the non-blocking area receives the sunlight during the daytime or the light projected by the low beam head lamp 41, and thus, a road compartment line can be constantly imaged. Also, the blocking area receives the infrared ray projected by the high beam head lamp 42 (and the visible light when the movable filter 43 is removed from the front surface of the high beam head lamp 42), and thus, a pedestrian or the like can be imaged.

The image data output from the camera 20 is used to execute a lane keeping control and a collision prediction control through image recognition. Hereinafter, an example in which the image data output from the camera 20 is used will be described.

For example, the lane keeping ECU 50 is a computer unit in which a CPU, a ROM, a RAM, and the like are connected to each other via a bus. In addition, the lane keeping ECU 50 includes a storage medium such as a HDD (Hard Disc Drive) or a DVD (Digital Versatile Disk), an input/output port, a timer, and a counter. The ROM stores programs executed by the CPU, and data.

The lane keeping ECU 50 recognizes the positional relation between the host vehicle and a driving lane, by analyzing a portion relating to the non-blocking area, in the image data input from the camera 20. Then, the lane keeping ECU 50 executes an interference control for an electric power steering device (i.e., a lane keeping control) to output assist steering torque for making the host vehicle travel without deviating from the driving lane. Also, the lane keeping ECU 50 controls a speaker, a buzzer, or the like so that a warning sound is generated at a timing at which the host vehicle is about to deviate from the driving lane. This reduces the driver's burden in operating the steering wheel, and stabilizes the trajectory of the vehicle, thereby contributing to traffic safety.

The positional relation between the host vehicle and the driving lane is recognized based on the position of the road compartment line in the image produced using the camera 20 (i.e., the image reproduced based on the image data). Hereinafter, the term "image produced using the camera 20" signifies the image reproduced based on the image data. When the road compartment line in the image produced using the camera 20 is recognized, for example, points, at each of which a luminance gradient (a luminance difference from an adjacent pixel) is equal to or above a threshold value, are extracted as feature points, and the points aligned in a straight line or in a curved line are recognized as an outline of the road compartment line. A dotted road compartment line, such as Botts' dots or cat's eyes, is recognized by appropriately combining the above-described process with a recognition process or the like using a morphological operation. In any case, a contrast (luminance difference) between a road surface (for example, an asphalt road surface) and a road compartment line needs to be clear in the image produced using the camera 20, in order to accurately recognize the road compartment line. In this regard, because the visible light cut filter 30 does not block or attenuate the visible light from the area extending to the position several tens of meters away from the front end portion of the vehicle, the contrast between the road surface and the road compartment line is sufficiently clear in a portion showing the area, in the image produced using the camera 20.

The collision prediction ECU 60 recognizes the distance or the positional relation between the host vehicle and a pedestrian or the like, by analyzing a portion relating to the blocking area, in the image data input from the camera 20. Then, the collision prediction ECU 60 executes an interference control (collision prediction control) for the electric power steering device and an electronically-controlled brake device, to avoid a collision between the host vehicle and a pedestrian or the like. More specifically, for example, when there is a pedestrian or the like in a driving lane in which the host vehicle travels, the distance between the host vehicle and the pedestrian or the like is equal to or shorter than a predetermined distance, and the speed of the host vehicle is equal to or higher than a predetermined speed, the collision prediction ECU 60 executes the control so that a steering force is automatically output to avoid the pedestrian, or a braking force is automatically output to stop the host vehicle before the pedestrian. The control executed by the collision prediction ECU 60 is not limited to the above-described control. The collision prediction ECU 60 may execute a control so that a seatbelt is automatically retracted or a pre-crash airbag is deployed in the host vehicle to prepare for receiving an impact at the time of collision, or an airbag is deployed on a hood to protect the head portion of the pedestrian or a hood is lifted to receive the head of the pedestrian.

The distance or the positional relation between the host vehicle and a pedestrian or the like is recognized based on the position and size of the pedestrian or the like in the image produced using the camera 20. In most cases, it is difficult to distinguish a pedestrian or the like from a background in the image produced using the visible light, because the contrast is not necessarily clear. However, by projecting the infrared ray and producing an image using the reflected infrared ray, it is possible to relatively easily recognize a pedestrian or the like in the produced image. It is difficult to recognize a pedestrian or the like in the non-blocking area. However, a pedestrian or the like in the blocking area, which is farther from the vehicle than the non-blocking area, is recognized, and the above-described control for avoidance of a collision or protection from a collision is started. Therefore, the function of the collision prediction control is maintained.

As evident from the above-described manner in which the vehicle imaging system 10 according to the embodiment is used, in the vehicle imaging system 10, one camera device outputs the image data including both of a portion produced using the visible light and a portion produced using the infrared ray. Thus, for example, a road compartment line is recognized by analyzing the portion produced using the visible light, and a pedestrian or the like is recognized by analyzing the portion produced using the infrared ray. Further, the upper portion of the image (i.e., the image of the area far from the host vehicle) is produced by blocking or attenuating the visible light. Therefore, the vehicle imaging system 10 is appropriate for recognizing both of the road compartment line and the pedestrian or the like. Also, the field of front vision of the driver is hardly obstructed. Accordingly, with the simple configuration, it is possible to output the image data produced by performing both of the visible light imaging and the infrared imaging.

Also, because the low beam head lamp 41 emits the visible light to the non-blocking area at night, it is possible to constantly recognize the road compartment line. Further, because the high beam head lamp 42 can project the infrared ray (or the infrared ray and the visible light in some cases) to the blocking area regardless of the time zone, it is possible to recognize a pedestrian or the like, regardless of the time zone.

It is conceivable to use a radar device to detect a pedestrian or the like. However, an object with a low permittivity, such as a pedestrian, does not sufficiently reflect the radar wave. Therefore, it is more advantageous to use the image produced using the infrared ray, than to use the radar device, for at least recognition of a pedestrian or the like.

Also, in the vehicle control apparatus 1 according to the embodiment, it is possible to execute the lane keeping control and the collision prediction control based on the image data output from one camera device. Accordingly, with the simple configuration, it is possible to perform a plurality of functions.

Figure 7:
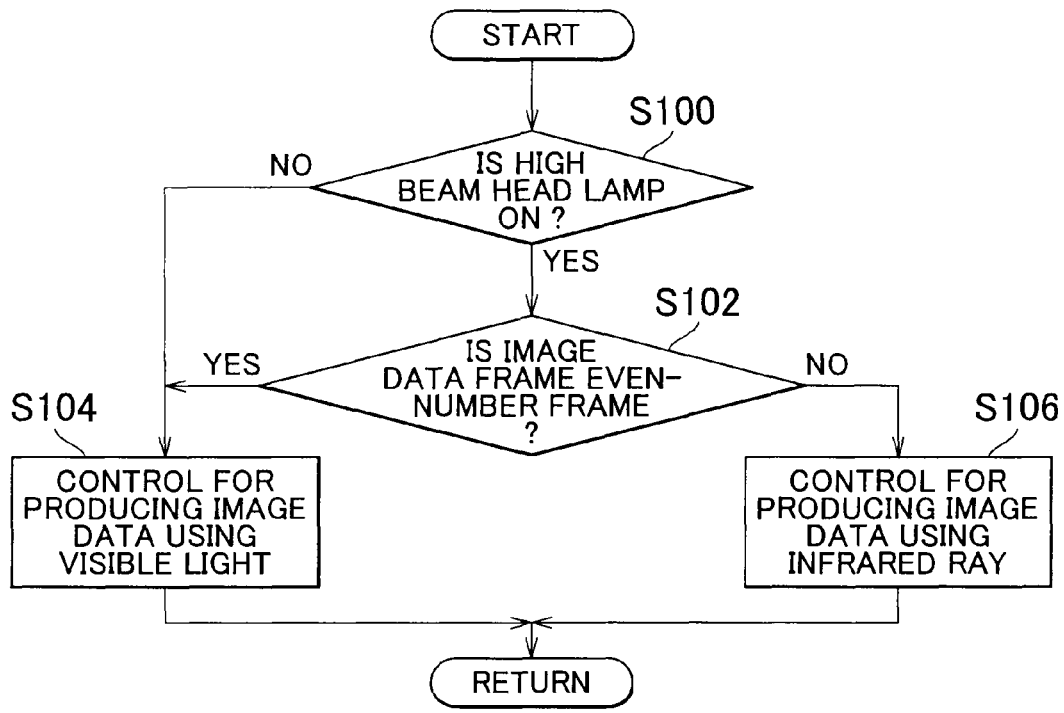
FIG. 7 is a flowchart showing a flow of a control executed by an electronic control portion.

The optimum shutter speed and gain for producing image data using the visible light differs from the optimum shutter speed and gain for producing image data using the near-infrared ray. Therefore, according to a flowchart as shown in FIG. 7, the electronic control portion 26 alternately outputs image data appropriate for recognizing a road compartment line, and image data appropriate for recognizing a pedestrian or the like. The flowchart in FIG. 7 is an example of the flowchart, and therefore, any modification may be made to the flowchart.

First, the electronic control portion 26 determines whether the high beam head lamp 42 is on, referring to information input from the light ECU 45 (S100). At this time, the state of the movable filter 43 is not determined. That is, it is determined whether the infrared ray is projected to the blocking area.

When the high beam head lamp 42 is off (i.e., when the infrared ray projection mode is not selected during the daytime, when the driver considers that the collision prediction control does not need to be executed, or when priority is given to energy saving), the infrared ray is not projected to the blocking area, and therefore, it is difficult to recognize a pedestrian or the like. Accordingly, the electronic control portion 26 controls the image sensor 24 at a shutter speed appropriate for recognizing a road compartment line, and produces the image data using a gain appropriate for recognizing a road compartment line (S104). In this case, the collision prediction control is not executed, and only the lane keeping control can be executed.

When the high beam head lamp 42 is on, the electronic control portion 26 determines whether an image data frame to be transmitted is an even-number frame (S102). Serial numbers (integer numbers) are sequentially assigned to image data frames to be transmitted, which relate to one imaging operation, starting from the first image data frame at the time of start of the vehicle. The image data frame to which an even number is assigned is referred to as an even-number frame.

When the image data frame to be transmitted is an even-number frame, the electronic control portion 26 controls the image sensor 24 at the shutter speed appropriate for recognizing a road compartment line, and produces the image data using the gain appropriate for recognizing a road compartment line (S104). When the image data frame to be transmitted is an odd-number frame, the electronic control portion 26 controls the image sensor 24 at a shutter speed appropriate for recognizing a pedestrian or the like, and produces the image data using a gain appropriate for recognizing a pedestrian or the like (S106). That is, the control in step S104 and the control in step S106 are alternately executed.

In the vehicle imaging system 10 according to the embodiment, it is possible to output the image data produced by performing both of the visible light imaging and the infrared ray imaging.

Also, in the vehicle control apparatus 1 according to the embodiment, it is possible to execute the lane keeping control and the collision prediction control based on the image data output from one camera device. Accordingly, with the simple configuration, it is possible to perform a plurality of functions.

Although the embodiment has been described, the invention is not limited to the embodiment. Various modifications and replacements may be made without departing from the scope of the invention.

Figure 8:
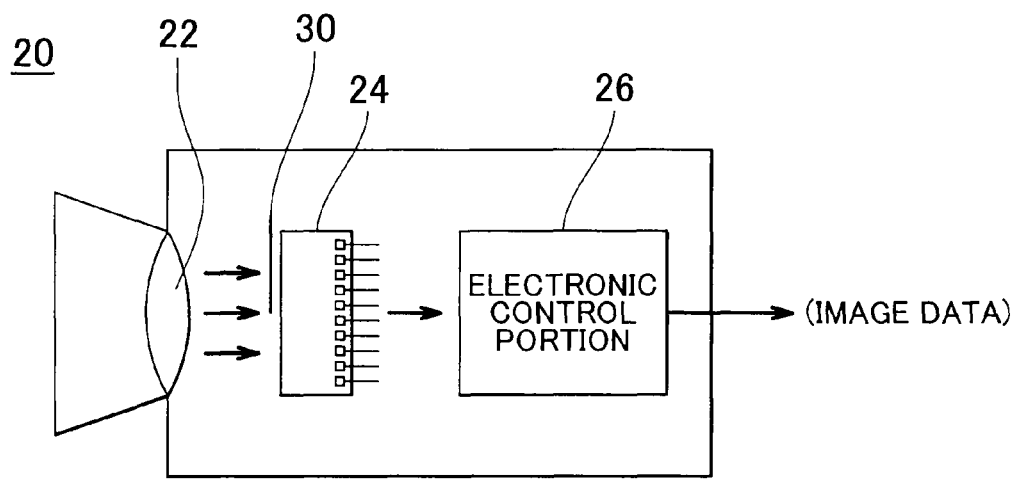
FIG. 8 is a diagram showing that the visible light cut filter is disposed between an imaging lens and an image sensor in a camera.

For example, in the embodiment, the visible light cut filter 30 is attached to, inserted into, or integrally formed with the front windshield 32. However, as shown in FIG. 8, in the camera 20, the visible light cut filter 30 may be disposed between the imaging lens 22 and the image sensor 24 at a position close to the image sensor 24.

Also, the camera 20 need not necessarily image the area ahead of the vehicle through the front windshield as described above in the embodiment. The camera 20 may be disposed at any position and may image an area in any direction, as long as the camera 20 images at least a part of an area around the vehicle. For example, the camera 20 may be provided inside a side mirror, and may image an area on the side of the vehicle. Alternatively, the camera 20 may be disposed near a front bumper, and may image an area ahead of, and on the side of the vehicle. In these cases, the visible light cut filter 30 may be disposed at a given position so that the visible light cut filter 30 can attenuate part of the visible light entering the camera 20, according to a position at which the camera 20 is disposed. (The visible light cut filter 30 may be disposed between the imaging lens 22 and the image sensor 24 as described above).

Also, means for projecting the infrared ray may be provided separately from the high beam head lamp 42. Alternatively, means for projecting the infrared ray may not be provided, and the camera 20 may produce the image using only the infrared ray emitted from a pedestrian due to the body temperature.

Also, the infrared ray projection mode described in the embodiment need not necessarily be selectable. In the vehicle imaging system 10, a pedestrian or the like may be recognized only at night.

The invention may be used, for example, in automotive industry and automotive parts industry.

What is claimed is:

1. A vehicle imaging system comprising:
    an imaging device that images at least a part of an area around a vehicle through a front windshield;
    a head light assembly including:
    a low beam head lamp which emits a visible light to a region ahead of the vehicle, and
    an infrared ray projection device that projects an infrared ray to a region ahead of the vehicle, the region to which the infrared ray is projected by the infrared ray projection device being farther from the vehicle than the region to which the visible light is emitted by the low beam head lamp; and
    a visible light attenuation device which is directly joined to the front windshield, and
    which attenuates part of visible light that enters the imaging device, wherein:
    the imaging device includes an imaging element that converts both of the visible light and the infrared ray to electric signals, the imaging device outputs both of image data produced based on the electric signal to which the visible light, which has entered the imaging device without passing through the visible light attenuation device, has been converted, and image data produced based on the electric signal to which the infrared ray, which has passed through the visible light attenuation device, has been converted, and
    wherein the visible light attenuation device, which is directly joined to the front windshield and attenuates part of the visible light that enters the imaging element, is disposed such that the infrared ray, which is projected by a high beam head lamp including the infrared ray projection device and is received by the imaging element, passes through the visible light attenuation device, and
    wherein the infrared ray projection device is positioned closer to a front end of the vehicle than the front windshield and the imaging device.

2. The vehicle imaging system according to claim 1, wherein:
    the imaging device images an area ahead of the vehicle through the front windshield.

3. The vehicle imaging system according to claim 2, wherein:
    the visible light attenuation device is disposed to attenuate the visible light that enters the imaging device from the region to which the infrared ray is projected by the infrared ray projection device.

4. The vehicle imaging system according to claim 3, wherein the infrared ray projection device is a high beam head lamp that is composed of a halogen lamp.

5. The vehicle imaging system according to claim 4, further comprising:
    a movable filter that is disposed ahead of the infrared ray projection device in a direction in which the infrared ray is projected, and that blocks or attenuate the visible light; and
    a drive device that changes a position of the movable filter between a position at which the movable filter covers a front surface of the infrared ray projection device, and a position at which the movable filter is removed from the front surface of the infrared ray projection device.

6. The vehicle imaging system according to claim 1, wherein the visible light attenuation device is disposed between the imaging element and an imaging lens that are provided in the imaging device.

7. A vehicle control apparatus comprising:
    the vehicle imaging system according to claim 1;
    a collision prediction control device that executes a collision prediction control based on the image data that is produced based on the electric signal to which the infrared ray has been converted, and that is output from the imaging device of the vehicle imaging system; and
    a lane keeping control device that executes a lane keeping control based on the image data produced based on the electric signal to which the visible light has been converted.

8. The vehicle imaging system according to claim 1, wherein the visible light attenuation device is directly joined to the front windshield by being directly affixed on, inserted into, or integrally formed with the front windshield.

* * * * *